FIG. 1

INVENTORS
J. F. CUBBIDGE
W. D. DRUKKER
R. G. FERNALD
E. N. LENK
F. W. TURNER
J. G. WEEKS
Q. W. WIEST
BY
a. c. Schwarz, Jr.
ATTORNEY

United States Patent Office 3,080,512
Patented Mar. 5, 1963

3,080,512
AUTOMATIC POSITIONING SERVOSYSTEM
James F. Cubbidge, Naperville, Ill., Willard D. Drukker, Worthington, Ohio, Russell G. Fernald, Downers Grove, and Elmer N. Lenk, Westchester, Ill., Frederick W. Turner, Flemington, N.J., and John G. Weeks, Downers Grove, and Quentin W. Wiest, Western Springs, Ill., assignors to Western Electric Company, Incorporated, New York, N.Y., a corporation of New York
Filed Sept. 14, 1959, Ser. No. 839,791
13 Claims. (Cl. 318—28)

This invention relates to an automatic positioning system and more particularly, to a programmed positioning system for automatically loading, locating, working upon and unloading a workpiece.

Many positioning systems are known in the prior art which are used in conjunction with manufacturing machinery, such as a punch press, which automatically position an article in relation to a punch, or which position the punch in relation to the article, by means of a template, cams or the like. Systems have been designed to control the positioning of the article electrically by means of servo-systems and mechanically by means of power driven screws. Each type of system, however, possesses limitations which are detrimental to efficient and accurate manufacturing operations.

Systems controlled by servo-motors, for example, are efficient for obtaining approximate locations of a work holder with respect to a tool, however for obtaining finite locations, the servo-systems perform inherent hunting operations which are time consuming. The power driven threaded shafts, or screws, are usually driven at high speeds for rough positioning and at low speeds for the final or accurate positioning of the work holder. In order to arrive at the final exact position, these systems often exhibit hunting characteristics, that is, the power driven shaft overdrives the work holder past the desired final position.

It is therefore an object of this invention to provide a new and improved automatic positioning system.

Another object of this invention is to provide a system for automatically and exactly positioning a workpiece by both electrical and mechanical devices.

Another object of this invention is to provide a system for locating a workpiece to an approximate desired position by a servo-control device and for accurately positioning the workpiece after the workpiece is positioned in the approximate position by a mechanical device.

Another object of this invention is to provide a source of intelligence to control the positioning of a workpiece by a servo-motor to an approximate desired location and then accurately locate the workpiece by a mechanical device having a number of precisely placed detent bars.

With these and other objects in view, the present invention contemplates an article positioning system comprising a first carriage movable in a first direction and an article retaining second carriage mounted for movement on the first carriage in a direction at right angles to the path of movement of the first carriage. A system is provided for controlling the movement of the two carriages in response to a punched or magnetic tape or other source of intelligence. The control system is provided with a pair of servo-motors for the carriages, each of which has associated therewith a device for producing an output voltage which varies depending upon the positioning of the carriage. Each output voltage is compared with a reference voltage derived from the intelligence in the tape and the associated motor is operated by the difference between the voltages until the two voltages are approximately equal, or a null condition is reached.

When a null condition is reached for each of the carriages, the two carriages are positioned at the approximate location directed by the reference voltages and the servo-motors are then disassociated from the carriages. At this point, the servo-motors have driven the carriages to position the article in the approximate location. After the disassociation of the servo-motors from the carriages, a plurality of plungers are actuated to engage detent bars which are connected to each carriage and offset from one another. Only two plungers of said plurality of plungers, one associated with each carriage, is successful in engaging a detent bar to force the carriages into a final and accurate position.

Other objects and advantages of the invention will become apparent upon consideration of the following detailed description in conjunction with the accompanying drawings, wherein.

The subsequent discussion is concerned with an automatic positioning system for loading a printed circuit board onto a carriage, moving the carriage in a single plane to selectively position the board in relation to a punch, punching the board in each selective position, and unloading a completely punched board. The positioning system, although described as positioning a printed circuit board, may be used to position any type of article, whether a workpiece or a machine tool and may be extended by the following principles of the present invention to control three dimensional movement of an article in lieu of two dimensional movement as described.

Referring now to FIGS. 1, 6, 7 and 8, a base 10 is provided with an elevated table 11 supported by members 12. A first or lower carriage 13 is mounted on the table 11 for transverse movement therealong by means of rollers 14 having a V-shaped groove 16 which mates with V-shaped edges 17 on the table 11. The first carriage 13 is moved transversely along the table 11 by means of a power driven shaft 18 having a gear or pinion 19 mounted thereon. The pinion 19 engages a rack 21 mounted to the under surface of the first carriage 13.

Figure 1:
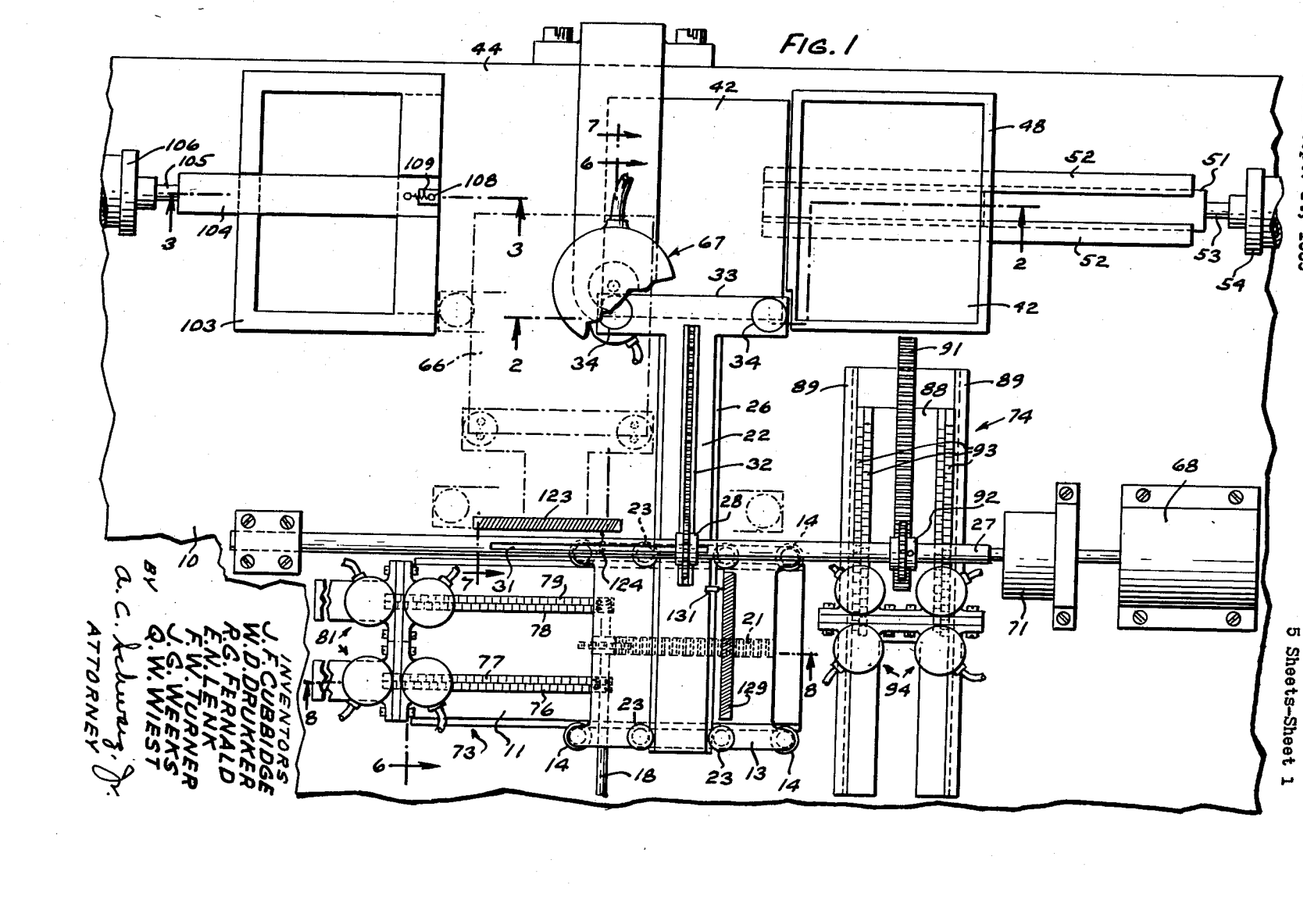
FIG. 1 discloses a plan view of an automatic positioning system employing the principles of the present invention.
Figure 8:
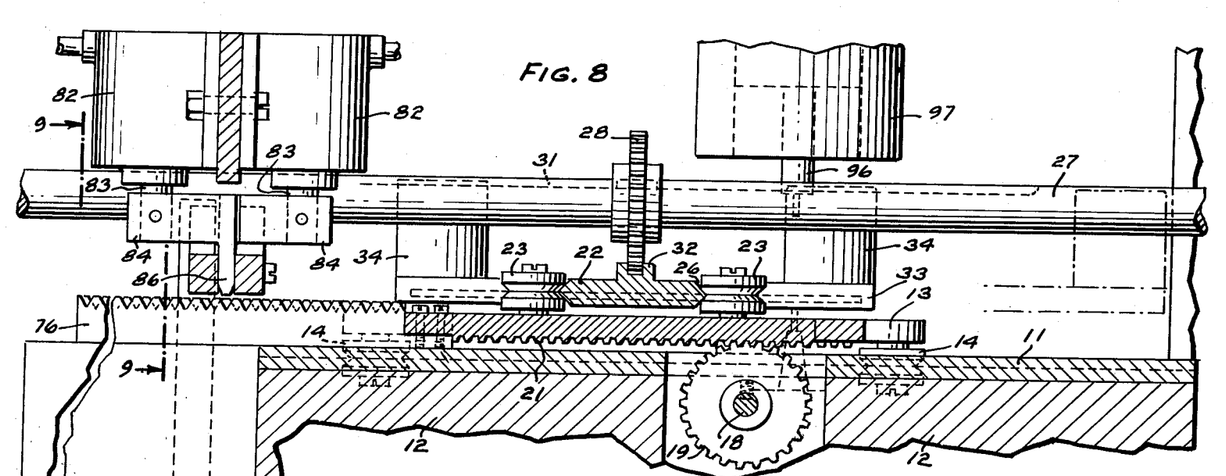
FIG. 8 is an enlarged sectional view taken along line 8—8 of FIG. 1 disclosing an apparatus for moving the two carriages at right angles to one another and disclosing a detent mechanism connected to one of the carriages for accurately positioning the carriage.
Figure 9:
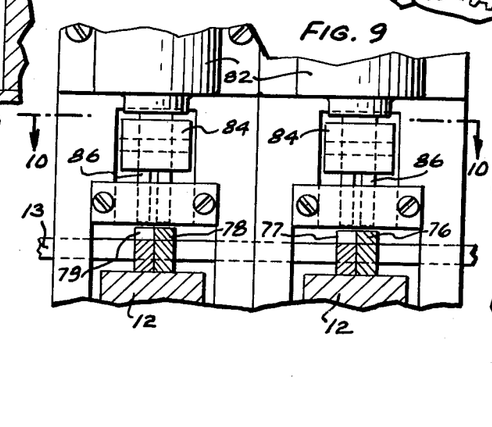
FIG. 9 is a sectional view taken along line 9—9 of FIG. 8 disclosing the details of the detent mechanism.
Figure 10:
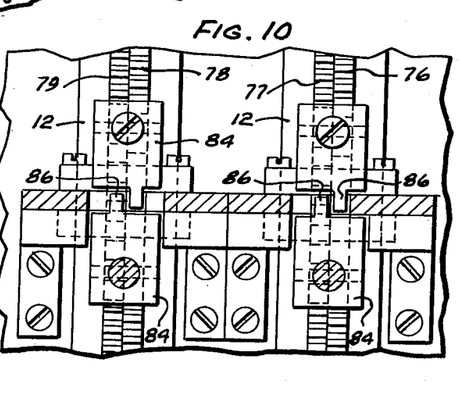
FIG. 10 is a sectional view taken along line 10—10 of FIG. 9 disclosing further details of the detent mechanism.

A second or upper carriage 22 is mounted on the first or lower carriage 13 for movement across, or at right angles to, the path of movement of the lower carriage 13. The upper carriage 22 is mounted on the lower carriage 13 by means of rollers 23 having V-shaped peripheral grooves 24 mating with V-shaped edges 26 on the carriage 22. The upper carriage 22 is moved across the lower carriage 13 by means of a power driven shaft 27 having a gear or pinion 28 mounted thereon. The pinion 28 is rotatable with the shaft 27 but is slidable relative thereto by being keyed to the shaft by means of a key 29 slidable within a groove 31 formed in the shaft 27. The pinion 28 is in engagement with a rack 32 mounted on the upper surface of the carriage 22.

The upper carriage 22 is provided with a cross member 33 having an article gripping device 34 mounted on each extremity thereof. The article gripping devices 34 are comprised of a plate 36 urged downwardly by a spring 37 and having mounted thereon a pin 38 and a shaft 39. The cross member 33 is provided with a slot 41 into which a printed circuit board 42 (shown in FIGS. 4 and 5) is inserted such that the pins 38 are inserted into a pair of aligning apertures 43 formed in the board 42.

In order to receive a printed board 42 to be punched, the power driven shafts 18 and 27 are operated to move the first and second carriages 13 and 22 to the full line position shown in FIG. 1. In this position, the carriage 22 is driven into abutting relationship with an elevated table 44 supported by the base 10 such that a tongue 46 (FIGS. 6 and 7) projecting from the table 44 is inserted into a groove 47 formed in the cross member 33. The carriage 22 is also moved to the extreme right-hand position as viewed in FIG. 1 adjacent to a loading hopper 48.

The loading hopper 48 retains a supply of boards 42 which are unpunched except for the aligning apertures 43 and the lowermost board in the hopper is supported by a tray 49. The tray 49 is connected to a pusher 51 which is slidably mounted within trackways 52 (FIG. 1) for movement toward and away from the hopper 48. The pusher 51 is operated by movement of a piston rod 53 of a cylinder 54.

Figures 2, 3, 4, 5:
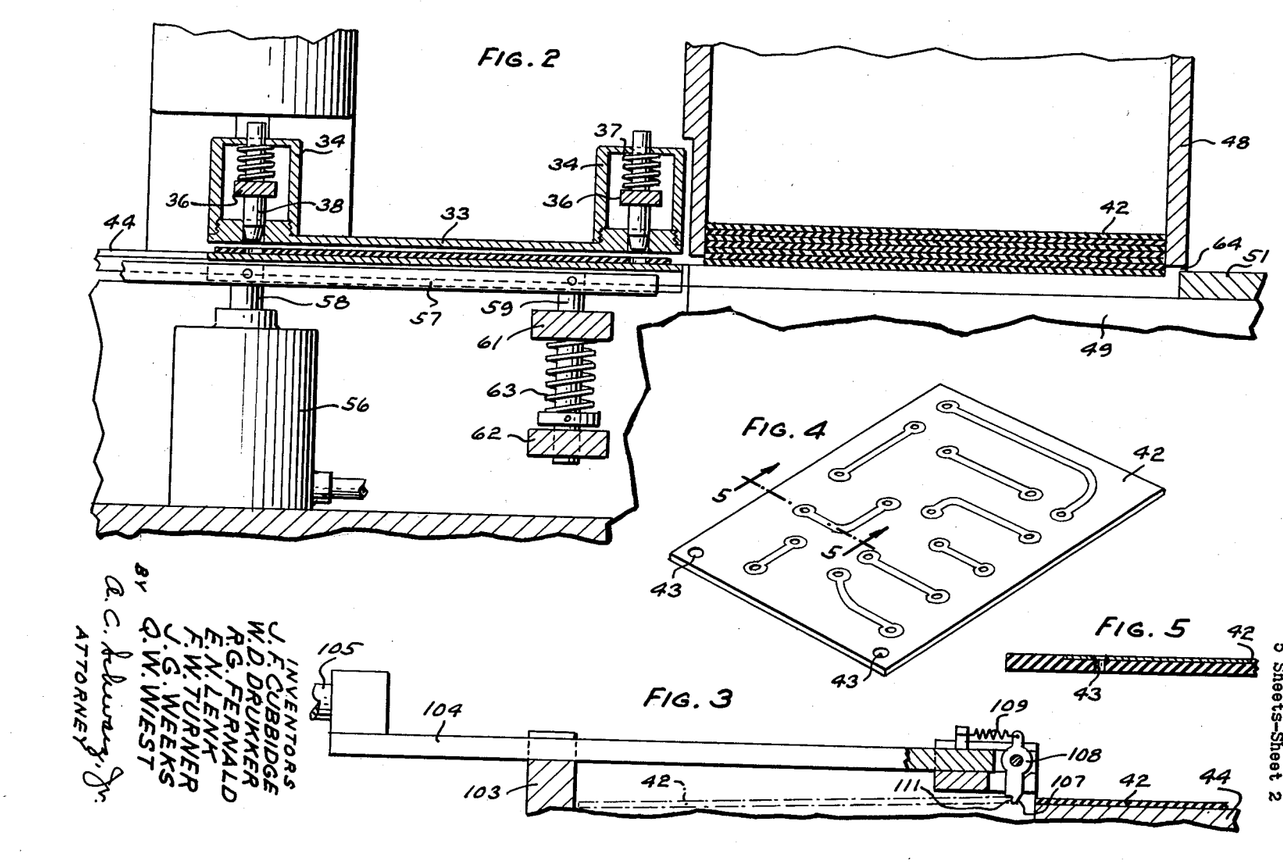
FIG. 2 is an enlarged sectional view taken along line 2—2 of FIG. 1 disclosing the manner in which articles are positioned on an article holding carriage.
FIG. 3 is an enlarged sectional view taken along line 3—3 of FIG. 1 disclosing an apparatus for removing an article from the article holding carriage.
FIGS. 4 and 5 are a perspective view and sectional view of an article to be positioned and operated upon by the apparatus shown in the other views.

In loading the boards 42 from the hopper 48 into the cross member 33, a cylinder 56 (FIG. 2) is operated to raise a plate 57 connected to a piston rod 58 of the cylinder 56. The plate 57 is supported by the rod 58 and a pair of shafts 59 mounted in brackets 61 (one of which is shown in FIG. 2. A collar 62 is mounted on each shaft 59 and a spring 63 positioned between the collar 62 and an upper leg of the bracket 61 forces the shaft, and therefore the plate 57, downwardly into a position shown in FIG. 7. Upon actuation of the air cylinder 56, however, the rod 58 forces the plate 57 upwardly against the effect of the springs 63 into engagement with the shafts 39 mounted on the plates 36 within the article gripping devices 34. The plate 57 moves the plates 36 upwardly against the force of the springs 37 to remove the pins 38 out of the slot 41 in the cross member 33 shown in FIG. 6.

At this time, the cylinder 54 is operated to move the pusher 51 and thereby the tray 49 to the left, as viewed in FIG. 1, to move the lowermost board 42 within the slot 41 in the cross member 33. The tray 49 is provided with an abutment 64 which engages the lowermost board 42 to position the board within the slot 41 and at the same time prevents the other boards from lowering until the tray 49 is returned to the retracted position shown in FIG. 2. After the board 42 has been positioned in the slot 41 in the cross member 33, the operation of the cylinder 56 is reversed and the plate 57 is returned to the lower position shown in FIG. 7 by the springs 63 acting against the collars 62. Lowering of the plate 57 allows the lowering of the plates 36 in the article gripping devices 34 to permit pins 38 to move within the apertures 43 formed in the board 42.

Figures 11, 12, 13:
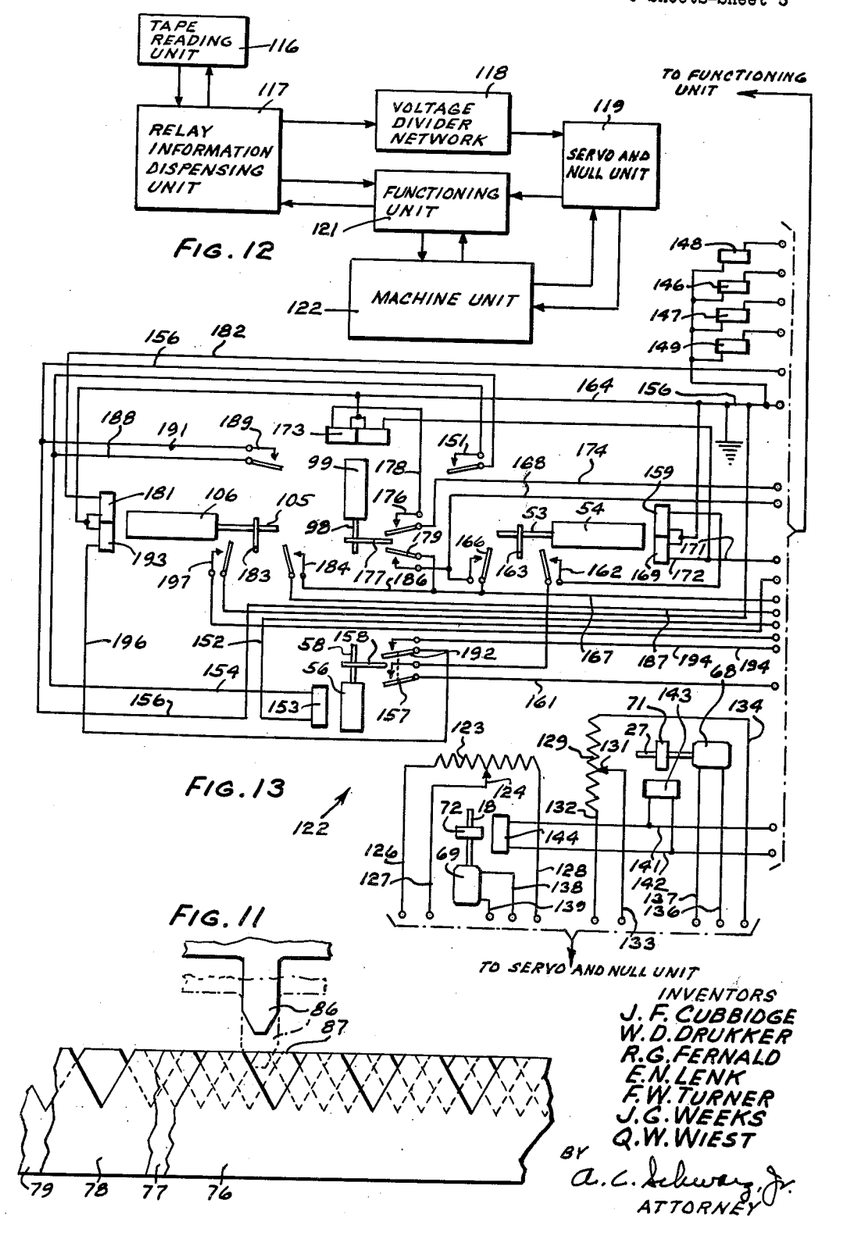
FIG. 11 discloses an enlarged fragmentary view of the detent bars associated with one of the carriages.
FIG. 12 is a block diagram of an electrical system which controls the automatic positioning system disclosed in FIG. 1.
FIG. 13 discloses the details of an electrical circuit for controlling the machine unit shown in FIG. 12.

After the board 42 is positioned and gripped in the slot formed in the cross member 33, the upper and lower carriages 22 and 13 are moved by the power driven shafts 27 and 18 to position the board in any desired location, such as the dotted line position 66 shown in FIG. 1, in relation to a punch assembly generally designated 67. The shafts 18 and 27 are driven by servo-motors 68 and 69 through clutches 71 and 72, respectively (FIG. 13). The servo-motors 68 and 69 are controlled to position the carriage 22, and thereby the board 42, to an approximate desired position. The motors are controlled such that after the board 42 is positioned to within .015 of an inch of the desired position, the clutches 71 and 72 are disengaged to disconnect the shafts 18 and 27 from the motors 69 and 68, respectively. The board is then positioned to the correct .050″ increment with an accuracy determined by the precision of the detent mechanism of the order of .001″ by a pair of detent positioning systems generally designated 73 and 74 for accurately positioning the carriages 13 and 22, respectively.

The detent positioning system 73 comprises four detent bars 76 to 79 (FIG. 11) each having accurately spaced distance registrations in the form of notches in the upper surface with the notches positioned .20 of an inch apart. As seen in FIG. 11, the detent bars 76 to 79 are positioned in offset relationship with respect to one another, such that the cumulative effect of the bars is to provide a solid upper surface when all the bars are viewed from a side elevation. The detent bars are connected in pairs to the carriage 13 (FIG. 1) for sliding movement therewith along the table 11 and are moved beneath a system of four detent pin assemblies generally designated by the numeral 81. Each of the detent pin assemblies is comprised of a cylinder 82 (FIG. 8) operable to reciprocate a rod 83 having a detent head 84 mounted on the lower extremity thereof. The detent head is provided with a downwardly extending projection having a tapered lower extremity forming a detent pin 86 for engaging one of the notches within the detent bars 76 through 79.

As may be seen in FIG. 1, a detent pin assembly is provided for each detent bar 76 to 79 and the detent bars with the associated detent assemblies are connected to form odd and even pairs. For example, the detent bars 76 and 77 and the associated pin assemblies represent even distances of .05 of an inch and detent bars 78 and 79 represent odd spaced distances of .05 of an inch. It may therefore be understood, that after the servo-motors 68 and 69 have positioned the board 42 within .015 of an inch, the clutches 71 and 72 are disengaged to disconnect the shafts 27 and 18, respectively, from the motors 68 and 69. At this time, either pair of the detent pin assemblies are operated, depending upon whether the desired position of the board 42 is at an even or odd .05 of an inch.

Assuming the board 42 were to be positioned at a point having a distance from the reference or loading position ending in a zero digit in the hundredths column, the detent pin assemblies associated with detent bars 76 and 77 would be actuated. As seen in FIG. 11, upon the actutation of the pair of associated detent pin assemblies, only one of the two pins 86 will fall within a V-shaped slot in the two detent bars 76 and 77. The other detent pin will engage the associated detent bar on the upper surface thereof which will prevent the pin falling into a V-shaped slot. The pin 86 associated with the detent bar 76 will engage the bar 76 as shown in the dotted line position shown in FIG. 11, and will force the detent bar 76 and carriage 13 connected thereto to the left as viewed in FIG. 11 to accurately position the carirage 13 to the correct .050 increment with an accuracy determined by the precision of the detent mechanism of the order of .001″. The detent pin associated with detent bar 77 will strike a portion 87 of the upper surface of detent bar 77 which will prevent the pin from being positioned in either of the two slots formed on the sides of the portion 87. Similarly, the detent pin assemblies associated with detent bars 78 and 79 would be actuated if the board 42 were to be positioned at a distance away from the reference or loading position ending in a five digit in the hundredths column.

The detent positioning system 74 associated with the carriage 22 is connected to the driven shaft 27 similarly as the carriage 22. A carriage 88 is provided which is movable within trackways 89 and has a rack 91 on the upper surface thereof. The rack 91 engages a pinion 92 which moves the carriage 88 equal distances as with movement of the carriage 22 upon rotation of the shaft 27. The carriage 88 supports four detent bars 93 beneath four detent pin assemblies 94 which function in a manner similar to the detent pin assemblies 81 to finally position the carriage 22 and place the board 42 in the exact desired location in increments of .05 of an inch.

Figures 6, 7:
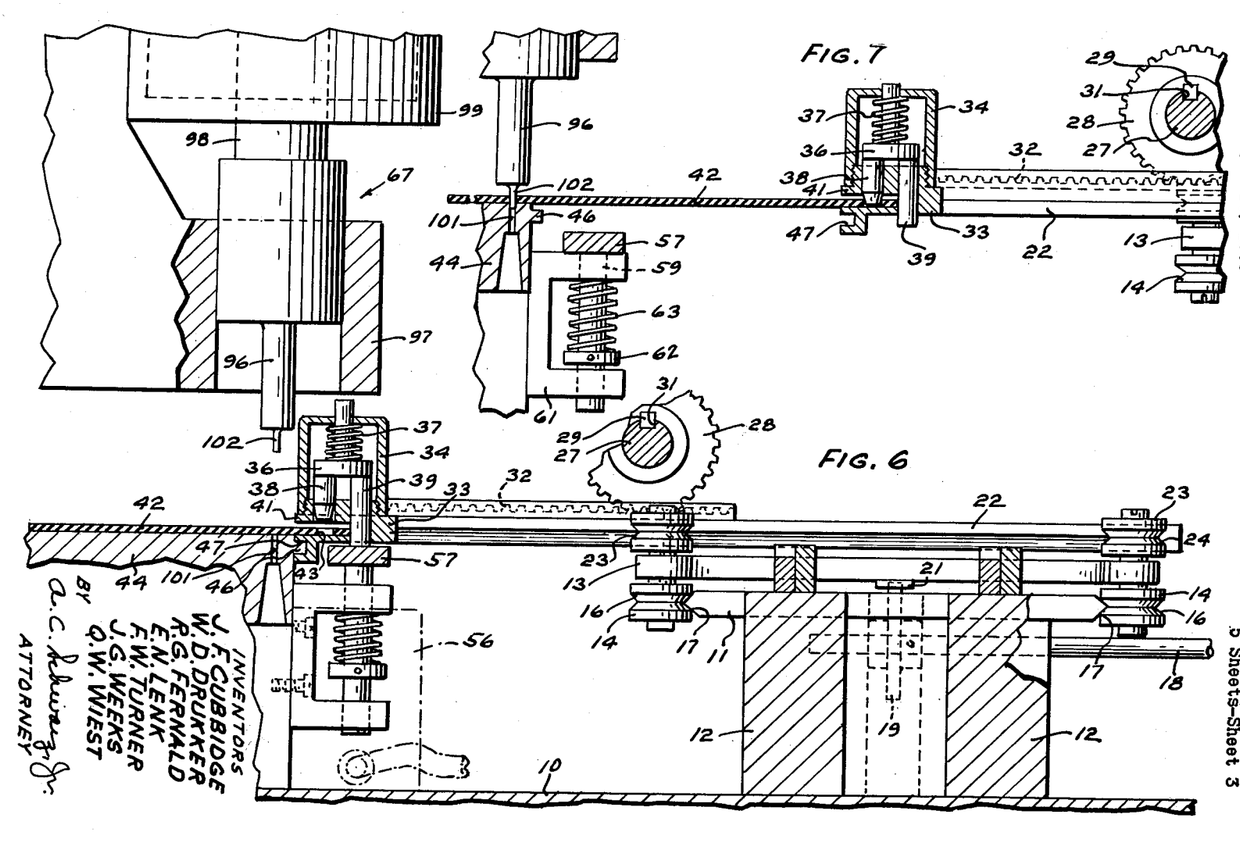
FIG. 6 is an enlarged sectional view taken along line 6—6 of FIG. 1 disclosing the position of a pair of movable carriages prior to loading of an article.
FIG. 7 is an enlarged sectional view taken along line 7—7 of FIG. 1 disclosing an article being positioned and held by the carriages for a punching operation.

When the board is thus positioned, as, for example, in the dotted line position 66 in FIG. 1, the punching assembly is actuated to punch an aperture within the board 42. The punching assembly 67 (FIGS. 6 and 7) comprises a punch head 96 slidable within a suitable sleeve 97 and is movable toward and away from the table 44 by means of a piston rod 98 of a cylinder 99. An aperture 101 is formed in the table 44 to complement a punch tip 102 on the head 96. As seen in FIG. 7, the table 44 is also used as an additional support for the board 42 when the carriage 22 is moved away from the table.

When the punching operations on the board 42 are completed, the carriages 13 and 22 are moved to position the board adjacent to an unloading hopper 103 (FIGS. 1 and 3). The cross member 33 is moved to the extreme left-hand position as viewed in FIG. 1 and abuts the table 44 with the tongue 46 positioned within the groove 47 formed in the cross member 33. For the unloading operation, a slide 104 is movably mounted within the framework of the unloading hopper 103 and is moved toward and away from the table 44 by means of a piston rod 105 of a cylinder 106. Upon the forward movement of the slide 104 toward the table 44, a beveled edge 107 of a catch member 108 engages the board 42. The catch 108 is pivoted at the end of the slide 104 and is urged into a vertical position by means of a spring 109. The board 42 engages the beveled edge of the catch 108 and pivots the catch against the force of the spring 109 until the slide 104 has moved the catch across the board 42 where the catch again is free to move to the vertical position shown in FIG. 3. At this point, the cylinder 56 is again actuated to raise the plate 57 which thereby removes the pins 38 from the apertures 43 formed in the board 42 as previously discussed. The slide 104 is then moved to the retracted position and a notched portion 111 formed in the catch 108 engages and slides the board 42 along the table 44 and into the unloading hopper 103.

*Operation*

Referring now to FIG. 12, there is shown a block diagram of a type of control that may be used in conjunction with the automatic positioning system. The desired movements and operations of the system are recorded on a punched or magnetic tape which is fed into a tape reading unit 116 of any commercially available type to convert the tape information to a series of pulses. The pulses in turn are sent to a relay information dispensing unit 117 which may be comprised of, for example, a system of relays responsive to the pulses from the tape reading unit 116 to operate and lock a plurality of relays representative of the distances that it is desired to move the two carriages 13 and 22. The relays thus operated, close a plurality of contacts within a voltage divider network 118 which places voltages onto the servo and null unit 119 which are in turn representative of the distances to be travelled by the carriages. The relay information dispensing unit 117 also operates a group of relays which conditions circuits within a functioning unit 121 to prepare the functioning unit to control the performance of various machine operations.

A machine unit 122, shown in detail in FIG. 13, has provisions therein for delivering to the servo and null unit 119 voltages representative of the exact positions of the two carriages at any particular time. The unit 119, which may be comprised of servo-amplifiers connected into any standard type of null detecting device, compares the voltages received from the machine unit 122 with the voltages from the unit 118 to obtain error voltages which are fed from the unit 119 to the machine unit 122 to operate the servo-motors 68 and 69. When the servo and null unit detects a substantial balancing of the voltages from the machine unit 122 and the network 118, a signal is supplied from the unit 119 to the functioning unit 121 allowing the functioning of the machine to proceed as directed by the information from the tape. As previously stated, the servo-system does not finally position the two carriages, but only positions the carriages in the approximate desired position.

Assume that the positioning system has just finished unloading a completely punched card and the tape reading unit 116 has been operated to translate a new section of tape into pulses that enter the relay unit 117. Relays within the unit 117 will be operated to set up a specific position for the two carriages, for example, the reference or loading position shown in FIG. 1. Relays will also be set up within the unit 117 to prepare circuits within the functioning unit 121 to prepare for a loading operation. Upon the setting up of these circuits within the functioning unit 121, the unit 121 operates through the unit 117 to the tape reading unit 116 to stop the tape reading unit until further information is required.

The desired position for the two carriages is transmitted to the voltage divider network by closure of the various relay contacts therein, which in turn applies voltages indicative of desired positions of the carriages, to the servo and null unit 119. Mounted on the frame 10 and adjacent to the path of movement of the carriage 13 is a potentiometer 123 (FIG. 1). The carriage 13 is provided with a slide wire 124 in engagement with the potentiometer 123 which delivers a voltage representative of the position of the carriage 13 to the servo and null unit 119 along conductors 126, 127 and 128 (FIG. 13). A second potentiometer 129 is mounted on the carriage 13 adjacent to the path of the carriage 22 and a slide wire 131 is mounted on the carriage 22 in engagement with the potentiometer 129 to send a voltage to the servo and null unit 119 through conductors 132, 133 and 134. The voltages from the potentiometers 123 and 129 are compared within the unit 119 against the voltages from the voltage divider network 118 and errors or differences in voltage are derived. The errors or differences in voltage are fed from the unit 119 to the machine unit 122 and are used to operate the motor 68 through conductors 136 and 137 and to operate motor 69 through conductors 138 and 139.

The motors 68 and 69 rotate the shafts 27 and 18, respectively, to position the two carriages as previously discussed until the desired position is approximately located. At this point, the unit 119 signals the functioning unit 121 that a null has been reached. The functioning unit 121, which may comprise merely a group of control relays, operates to remove power from the conductors 141 and 142 which deenergizes clutch coils 143 and 144 to disengage clutches 71 and 72, respectively. The functioning unit 121 then operates to energize coils 146 and 147, if the desired location ends in an even numbered digit, or coils 148 and 149 if the desired position ends in an odd numbered digit. The coils 146, 147, 148 and 149 are used to actuate cylinders 82 of the detent pin assemblies 81 and 94 corresponding to the detent bars of carriages 13 and 22, as previously described.

The final positioning of the carriage 22 at the loading or reference position closes a switch 151 which completes a circuit from the functioning unit through a conductor 152, coil 153, conductor 154, switch 151, and conductor 156 to ground, thereby operating the cylinder 56 to raise the bar 57 and thereby the pins 38 of the article gripping devices out of the slot 41 in the cross member 33. As the functioning circuit has been conditioned for a loading operation, and as the cylinder 56 has been operated to close a switch 157 by means of a projecting member 158 on the piston rod 58 (FIG. 13), the load cylinder 54 will now operate under the control of an advance coil 159. Coil 159 is operated by a circuit completed from the functioning unit 121 through conductor 161, closed switch 157, a switch 162 which is closed by a projecting member 163 when the piston 53 of the load cylinder 54 is in the retracted position, through the coil 159, and conductors 164 and 156 to ground.

The forward movement of the piston rod 53 of the cylinder 54 closes a switch 166 by engagement with the projecting member 163 to complete a circuit in the functioning unit 121 through conductors 167 and 168 to reset the positioning system. When the positioning system is reset, the cylinder 56 is deenergized to insert the pins 38 of the article gripping devices 34 into the apertures 43 formed in the board 42. The coils 146 through 149 which were operated to finally position the carriages 13 and 22 are now restored. A retracting coil 169 is also energized at this time from the functioning unit 121 through conductors 171 and 172, the coil 169 and the conductors 164 and 156 to ground to retract the piston rod 53 of the cylinder 54. Also in the reset operation, the coils 143 and 144 are energized to again engage the clutches 171 and 172, respectively. The relays in the functioning unit 121 and in the relay information dispensing unit 117 are restored and a signal is sent from the functioning unit 121 through the unit 117 to the tape reading unit 116 to again start the next successive tape reading.

The next tape reading again sets up relays in the unit 117 to place voltages on the servo and null unit 119 which operate the servo motors 68 and 69 as previously described. The relay unit 117 has prepared the relays in the functioning unit 121 to control a punching operation. After the two carriages have been positioned by the servo motors and the detent positioning systems, the punch head 96 is driven downwardly under the action of the piston rod 98 upon actuation of the cylinder 99. The cylinder 99 is actuated by the operation of the advance coil 173 which is connected into a completed circuit from the functioning unit 121 through conductor 174, a switch 176 closed by a projecting member 177 when the piston rod 98 is in the retracted position, a conductor 178, coil 173 and conductors 164 and 156. At the lower end of the punching stroke, the projecting member 177 closes a switch 179 to complete a reset circuit within the functioning unit 121 which performs as previously described to reset the system and retract the piston rod 98.

The tape reading unit 116 continues to control punching operations at various locations until the punching of the board 42 is completed. The tape reading unit thereafter translates voltages from the tape through the units 117 and 118 to the unit 119 for positioning the board 42 at the unloading position. When the board is finally positioned at the unloading station as previously described, the functioning unit 121 operates a coil 181 from the unit 121 through a conductor 182, the coil 181 and conductors 164 and 156 to ground to actuate the unloading cylinder 106.

At the termination of the forward stroke of the piston rod 105 associated with the cylinder 106, a projecting member 183 on the piston rod 105 closes a switch 184 which completes a circuit within the functioning unit 121 through conductors 186, 167 and 187 to allow the operation of cylinder 56 to release the board 42. The cylinder 56 is operated by the energizing of the coil 153 from the unit 121 through conductor 152, coil 153, conductors 154 and 188, through a switch 189 closed by the positioning of the board at the unloading station, and conductors 191 and 156.

Operation of the cylinder 56 closes a switch 192 by the projecting member 158 to complete a circuit through a retracting coil 193 of the unloading cylinder 106 from the functioning unit 121, conductor 194, switch 192, conductor 196, coil 193, through conductors 164 and 156 to ground. The cylinder 106 is then operated to reverse the movement of the piston rod 105 and slide 104 to carry the board 42 into the unloading hopper 103. Upon the reverse movement of the piston rod 105, the projecting member 183 closes a switch 197 to reset the system as previously described and to operate the tape reading unit 116 which controls the system to load another board 42 from the loading hopper 48 onto the upper carriage 22.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a system for selectively positioning a carriage, means mounting the carriage for movement in a rectangular coordinate system, a source of signals that are indicative of the first and second coordinates of a predetermined position to be assumed by the carriage, means responsive to the signals for accordingly producing voltages indicative of the coordinates of the position to be assumed by the carriage, means controlled by the voltages for moving the carriage to an initial rectangular coordinate position, mechanical means for further moving the carriage into the predetermined position, and means rendered effective by the carriage moving into the initial rectangular coordinate position for operating said mechanical means.

2. In an automatic positioning system, article carrying means movable to position an article in selected spaced locations relative to a reference location, an electrical servo-system for moving said article carrying means to position the article within predetermined limits of a desired location, mechanical means drivingly engageable with said article carrying means when the article has been positioned within the predetermined limits by said servo-system, said mechanical means being operative to drive said article carrying means to position the article at the desired location, and means operable upon the positioning of said article carrying means within the predetermined limits of the desired location by said servo-system for effecting operation of said mechanical means.

3. In a system for selectively positioning a member, means mounting the member for movement along rectangular coordinates, means for producing a first pair of voltages representative of the rectangular coordinates of a predetermined position to be assumed by the member, means controlled by the position of the member for producing a second pair of voltages representative of the rectangular coordinates of the position of the member, means responsive to the differential voltages between the first and second pairs of voltages for moving the member toward the predetermined position until the differential voltages approach predetermined magnitudes, and means rendered effective by the movement of the member in response to the differential voltages for further moving the member into the predetermined position.

4. In a system for selectively positioning a carriage, means mounting the carriage for movement in a rectangular coordinate system, a source of signals that are indicative of the first and second coordinates of a predetermined position to be assumed by the carriage, means responsive to said signals for accordingly producing voltages indicative of the coordinates of the predetermined position to be assumed by the carriage, means controlled by the voltages for moving the carriage to the predetermined rectangular coordinate position within defined limits thereof, and mechanical means rendered effective by the carriage moving within the defined limits of the rectangular coordinate position for driving the carriage into the predetermined rectangular coordinate position.

5. In an automatic positioning system, article carrying means movable to position an article in selected spaced locations relative to a reference location, detent means movable with said article carrying means and having regularly spaced distance registrations formed therein, an electrical servo-system for moving said article carrying means to position the article and said detent means in an approximate desired location, positioning means drivingly engageable with the registrations in said detent means for driving said article carrying means to an exact desired location, and means operable by said servo-system positioning said article carrying means in the approximate desired location for operating said positioning means.

6. In an automatic positioning system, a plurality of interconnected carriages each movable in a different direction for positioning an article carried by one of said carriages, a servo-motor system for moving each carriage to an approximate desired location, means controlled by the movement of each carriage for producing a voltage proportional to said location of the carriage, a voltage source for producing a reference voltage representative of a desired location of each carriage, means connected to the voltage producing means and the voltage source for comparing the voltages thereof and producing differential voltages to drive motors in said servo motor system to more said carriages to the approximate desired locations, detent means movable with each carriage and each having regularly spaced distance registrations formed therein, positioning means for engaging the registrations in said detent means for moving said carriages to the exact desired locations, and means operable upon the differential voltages approaching substantially zero for disconnecting the motors from said carriages and operating said positioning means.

7. In an automatic positioning system, a plurality of interconnected carriages each movable in a different direction for positioning an article carried by one of said carriages, a servo-motor system connected to move each of the carriages, means on each carriage for producing a voltage representative of the location of the carriage, a voltage source for producing a reference voltage representative of a desired position of each carriage, a servo and null sensitive network connected to the voltage producing means and the voltage source for comparing the voltages therefrom and producing differential voltages for operating said servo-motor systems, a plurality of detent bars connected to and movable with each carriage and each having a plurality of accurately spaced notches therein, said bars associated with each carriage being positioned in off-set relationship with respect to one another, a detent pin assembly associated with each bar for engaging and accurately locating said detent bars, means for selectively operating a portion of said assemblies depending upon the desired location of the carriages to accurately position the carriages, and means operable by the servo and null sensitive means upon movement of the carriages to approximately the desired position for disconnecting the motor systems from the carriages and operating said selective operable means.

8. An article positioning apparatus, which comprises, a base, an article supporting carriage movably mounted on said base, a detent bar having accurately spaced notches formed therein and connected to the carriage for movement therewith, a servo-motor connected to the carriage for moving the carriage and detent bar, means mounted on said base along the path of movement of the carriage for producing a voltage representative of the location of the carriage, a voltage source for producing a voltage representative of a desired location of the carriage, a servo and null network connected to the voltage producing means and the voltage source for comparing the voltages therefrom and producing a differential voltage to drive said servo-motor to position the carriage within the limits of a notch defining an exact desired location, a detent pin assembly mounted on the base and over said bar for moving a detent pin into engagement with said bar to accurately position the carriage at the desired location, and means operable after the positioning of the carriage within the limits of said notch for disconnecting the servo-motor from the carriage and operating the detent pin assembly.

9. An article positioning apparatus which comprises, a base, an article supporting carriage movably mounted on said base, a plurality of detent means connected to said carriage for movement therewith and each having accurately spaced distance registrations formed therein, said detent means being off-set from one another such that the registrations are positioned in an overlapping relationship, means for moving the carriage and detent means to an approximate desired location, means associated with each detent means for engaging the registrations in said detent means to accurately position the carriage in an exact desired location, and means operable after the positioning of the carriage in the approximate desired location for selectively operating a portion of said engaging means depending upon the desired position of the carriage.

10. An article positioning apparatus, which comprises, a base, an article supporting carriage movably mounted on said base, a motor system connected to said carriage for the movement thereof, a plurality of detent bars having accurately spaced notches formed therein and connected to the carriage for movement therewith, said bars being off-set from one another such that the notches are positioned in overlapping relationship, means for selectively engaging the notches in the bars to accurately position the carriage in an exact desired location, means for operating the motor system to move the carriage and bars within the limits of one of the notches which defines the exact desired location, and means operable after the positioning of the carriage within the limits of the one notch for disconnecting the motor system from the carriage and operating the selectively engaging means to engage said one notch to position the carriage in said exact desired location.

11. An article positioning apparatus, which comprises, a base, an article supporting carriage movably mounted on said base, a plurality of detent bars having accurately spaced notches formed therein and connected to the carriage for movement therewith, said bars being displaced from one another such that the notches are positioned in overlapping relationship, a servo-motor connected to the carriage for moving the carriage and bars, means mounted on said base along the path of movement of the carriage for producing a voltage representative of the location of the carriage, a voltage source for producing a voltage representative of a desired location of the carriage, a servo and null network connected to the voltage producing means and the voltage source for comparing the voltages therefrom and producing a differential voltage to drive the servo-motor to position the carriage within the limits of one of the notches which defines an exact desired location, a detent pin assembly associated with each detent bar and mounted on the base over said bars, a detent pin mounted in each assembly for advancement into engagement with an associated bar to accurately position the carriage, and means operable after the positioning of the carriage within the limits of said one notch for disconnecting the servo-motor from the carriage and selectively operating the detent pin assemblies to advance one of said pins into engagement with said one notch.

12. Apparatus for positioning an article in selected spaced locations with respect to a reference location, which comprises a base, a carriage movably mounted on said base for supporting the article, a detent assembly mounted on said base, a detent assembly connected to said carriage for movement therewith, one of said detent assemblies including a row of regularly spaced distance registrations provided with cam surfaces, the other of said detent assemblies including a detent member which is engageable with the cam surfaces of the registrations for driving said carriage, means for moving said carriage to within predetermined limits of a desired location, and means operable upon the positioning of said carriage within the predetermined limits of the desired location for moving said detent member into engagement with a cam surface of one of the registrations to drive said carriage and the article to the desired location.

13. Apparatus for positioning an article in a desired location with respect to a reference location, which comprises a base, a carriage movably mounted on said base for supporting the article, a detent assembly mounted on said base, a detent assembly connected to said carriage for movement therewith, one of said detent assemblies including parallel rows of regularly spaced distance registrations with the rows of registrations being offset longitudinally relative to one another such that successive registrations overlap and are equally spaced apart, the other of said detent assemblies including detent means cooperable with any selected one of the rows of registrations for accurately positioning said carriage and the article in the desired location, means for moving said carriage to within predetermined limits of the desired location, and means operable upon the positioning of said carriage within the predetermined limits of the desired location, for selectively operating said detent means to cooperate with a selected one of said rows of registrations depending upon the desired location of the article within said predetermined limits.

References Cited in the file of this patent
UNITED STATES PATENTS

| | | |
|---|---|---|
| 2,676,289 | Wulfsberger et al. | Apr. 20, 1954 |
| 2,802,978 | Legros | Aug. 13, 1957 |
| 2,820,936 | Rainey | Jan. 21, 1958 |
| 2,907,937 | Agpar et al. | Oct. 6, 1959 |
| 2,941,136 | Marantelle et al. | June 14, 1960 |
| 2,987,661 | Schweitz | June 6, 1961 |